US006353867B1

United States Patent
Qureshi et al.

(10) Patent No.: US 6,353,867 B1
(45) Date of Patent: Mar. 5, 2002

(54) VIRTUAL COMPONENT ON-CHIP INTERFACE

(75) Inventors: Amjad Qureshi, Sunnyvale; Ajit J. Deora, Fremont; Ramana Kalapatapu; Sagar Edara, both of San Jose, all of CA (US)

(73) Assignee: inSilicon Corporation, San Jose, CA (US)

( * ) Notice: Subject to any disclaimer, the term of this patent is extended or adjusted under 35 U.S.C. 154(b) by 0 days.

(21) Appl. No.: 09/484,111

(22) Filed: Jan. 14, 2000

(Under 37 CFR 1.47)

(51) Int. Cl.⁷ .............................................. G06F 13/00
(52) U.S. Cl. ..................................................... 710/129
(58) Field of Search ................ 710/100, 105, 710/126, 127, 128, 129

(56) References Cited

U.S. PATENT DOCUMENTS 5,845,107 A * 12/1998 Fisch et al. ................. 710/129
6,018,782 A * 1/2000 Hartmann ................... 710/129
6,035,364 A * 3/2000 Lambrecht et al. ......... 710/129
6,128,688 A * 10/2000 Kondo et al. ............... 710/129

* cited by examiner

*Primary Examiner*—Glenn A. Auve
(74) *Attorney, Agent, or Firm*—Douglas S. Rupert; Wildman, Harrold, Allen & Dixon

(57) ABSTRACT

Two on-chip buses (OCBs) having respective standardized definitions are implemented on a multi-function system chip, with one of the OCB definitions being a subset of the other. System virtual components (VCs) are connected to the system OCB with a system virtual component interface or "bus wrapper". "Peripheral" virtual components are connected to a peripheral OCB using respective standard interface blocks. Since the definition of the peripheral OCB is a subset of the system OCB, bridging between the two OCBs is relatively straightforward. The invention permits a "plug and play' capability on behalf of all peripheral VC designs implemented according to the standard, such that the systems integrator may mix and match peripheral VCs without degradation of functionality or performance.

12 Claims, 13 Drawing Sheets

T0 = No request or reset
T1 = req
T2 = Always
T3 = Always
T4 = (!PAck | PStop) & PCmdvalid
T5 = (PAck & PBurst)
T6 = (PAck & PBurst)
T7 = (PAck & !PBurst & req) | (!PStop & req)
T8 = (PAck & !PBurst & !req) | (!PStop & !req) / Timeout
T9 = (T7)
T10 = (T8)

MASTER SHOULD TIME OUT AFTER 16 CYCLES FROM

US 6,353,867 B1

VIRTUAL COMPONENT ON-CHIP INTERFACE

TECHNICAL FIELD OF THE INVENTION

The present invention relates in general to very large-scale integrated circuits on single semiconductor chips, and more particularly relates to a system and methodology employing standardized on-chip bus definitions and virtual component interfaces.

BACKGROUND OF THE INVENTION

In present-day integrated circuit design, it is commonplace to implement different circuits or components in a single semiconductor chip. Large-scale integration of this kind saves costs in assembly, can increase reliability, and generally increases overall system speed. On-chip buses are used to interconnect "virtual" components (VCs; so-called because they are self-contained, perform distinct functions but are not implemented as physically separate devices) on single, multiple-function chips.

As designers have sought to implement more and more VCs on a single chip, the kinds and numbers of the several interconnecting on-chip buses have proliferated. Conventionally, there is no single bus which satisfies the requirements of every VC on the chip. Each conventional bus design has its own strengths and weaknesses. A need has therefore arisen on the part of systems integrators to develop an intercomponent connection methodology and VC interface that avoids a large number of buses and which can be used as a standard for VC designers and integrators.

SUMMARY OF THE INVENTION

According to the invention, a standard interface block (SI) is provided which enables system designers to mix and match virtual components from different vendors. Each virtual component, or VC, has a virtual component interface, often called a VCI. The VCI in turn communicates through the standard interface ("SI") block to each interface. In this way, all virtual components implemented on the chip can communicate with each other using one or two buses of a predetermined, standardized design, and each VC+SI combination creates an encapsulated, reusable architectural component that can be mixed and matched with any other such architectural component while maintaining acceptable functionality and performance of the chip.

In a preferred embodiment, the system design has at least two buses: a system on-chip bus which has a large bandwidth and enhanced functionality, and a "peripheral" on-chip bus which has a definition that is a subset of the system on-chip bus. System VCs are connected through their system VCIs to the system on-chip bus, while the typically slower "peripheral" VCs are connected, as configured according to their respective peripheral VCIs, through respective SI blocks to the peripheral on-chip bus. A bridge is provided between the system and peripheral buses for communication between system and peripheral virtual components, and this bridge includes a standard SI block.

The present invention confers the following technical advantages. The interface according to the invention enables maximum portability of customer-designed VCs. Once made compliant with the protocol of the bus to which they will be connected, VCs do not require modification in order to connect to a different bus having this protocol. The system bus definition is a compatible superset of the peripheral bus definition, enhancing interoperability choices for the system designer and design opportunities for the VC designer. Optional signals are minimized in their number in order to minimize the complexity of VCI compliance checking.

In order to obtain these advantages, the preferred embodiment of the invention has the following characteristics. First, master/slave connections are point-to-point and unidirectional. Both multiplexed and tri-state on-chip buses can be supported by allowing the on-chip bus wrappers or SI blocks to implement the on-chip bus transceivers. Unidirectional buses are simpler to handle and circumvent the requirement for arbitration in the VCI protocol. Second, the master VC can only present requests, and the slave can only respond. If a VC requires both of these capabilities, then parallel master and slave interfaces are implemented in the VC and SI block. Read and write are the two fundamental requests. The peripheral VCI signal set is enhanced in the system VCI specification.

Third, only valid transfers should cross the VCI interface. The master VC sends only information that the linked slave VC can understand. This is mandated by the lack of an error or rejection mechanism, which the peripheral bus according to the invention intentionally avoids as being too complex.

Fourth, address/data widths are determined by VC requirements. The on-chip bus target master should scale its address/data widths to match the slave.

Fifth, the bus specification should insure that any required data and address storage in the bus wrappers is minimal.

Sixth, clock domain crossing should not be visible at the interface. The peripheral interface according to the invention is fully synchronous.

Seventh, the acknowledge (Ack) signal should be independent of anything outside of the control of the peripheral VC. This precludes the need for a time-out mechanism.

BRIEF DESCRIPTION OF THE DRAWINGS

Further aspects of the invention and their advantages will be discerned in the following detailed description, when taken in conjunction with the drawings, in which like characters denote like parts and in which.

DETAILED DESCRIPTION

Overall Architecture

Figure 1:
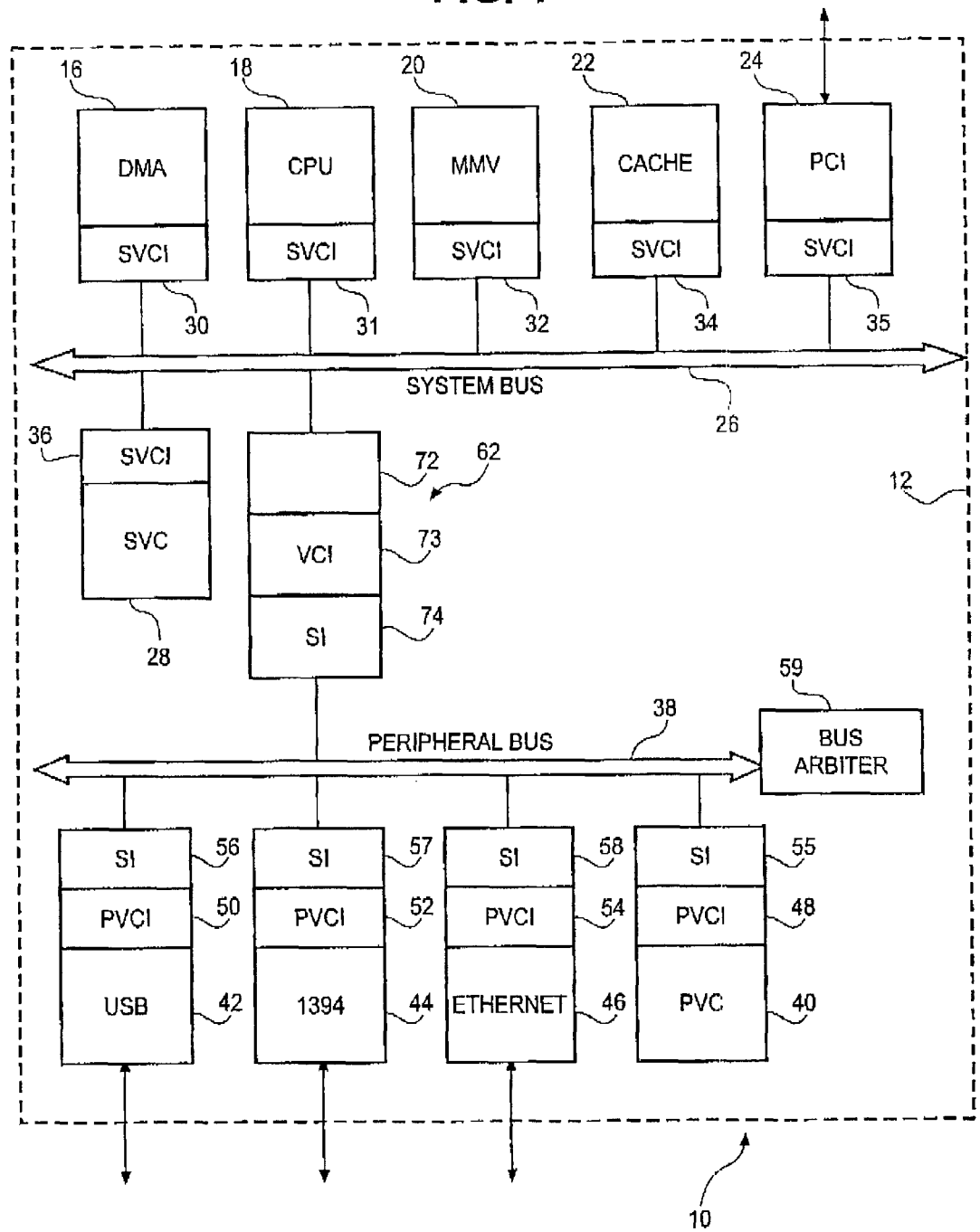
FIG. 1 is a high-level schematic block diagram of an on-chip system employing the invention.

In FIG. 1, an electronic system 10, which can include many of the electronic components found in a conventional personal computer, is implemented on a single semiconductor chip, shown schematically by the dashed line 12. This "system on a chip" (SOC) contains many subcomponents, called virtual components or VCs. The VCs have different communications requirements and therefore are connected to different buses. The designs for the VCs may come from several different and often third party sources and are selected for inclusion on chip 12 by a systems integrator.

A system bus 26 is used for interconnection to high-speed "host" or "system" VCs, which can include a DMA controller 16, a CPU 18, an MMU 20, a cache memory 22, and a peripheral component interconnect (PCI) port circuit 24. A generalized system VC is schematically shown at 28, to represent other possible system VCs.

"Host" or "system" VCs 16, 18, 20, 22, 24 and 28 connect to this bus 26 through respective system VC interface circuits 30–36. The bus 26 preferably is a 64-bit split transaction bus with capabilities of address and data pipelining. In one embodiment, the system bus 26 has a maximum of eight nodes.

A second, "peripheral" on-chip bus 38 is the connecting bus for one or more peripheral VCs, of which a generalized example is peripheral VC 40. The peripheral VCs can include port circuits making up respective communications ports, including universal serial bus (USB) VC 42, IEEE 1394 protocol VC 44, and an ethernet VC 46. Each of these peripheral VCs 40–46 has a respective peripheral VC interface circuit 48, 50, 52 or 54. The peripheral VC circuits 48–54 are in turn connected to the peripheral bus 38 by standard interface (SI) blocks 55, 56, 57 and 58. A peripheral bus arbiter 59 controls use of the peripheral bus 38, preferably using a round-robin method. In the illustrated embodiment bus 38 is a 32-bit bus of more limited functionality and slower speed than the system bus 26.

To allow communication between the system VCs and the peripheral VCs, a bridge 62 is placed between the two buses. The bridge 62 consists of a system bus interface block 72, a virtual component interface block 73, and a standard interface (SI) block 74. The SI block 74 is substantially identical to SI blocks 55–58.

Difinition of Peripheral Bus

In the illustrated embodiment, the peripheral bus 38 is a single-cycle bus with wait states running at approximately 40 MHz, and has two-cycle request-to-grant timing. The illustrated bus 38 can have up to sixteen nodes. The bus 38 will support unlimited burst length. Bursts can be one, two or four bytes per transfer, but cannot be changed "on the fly", i.e., during a burst transfer. The bus 38 has up to 32 bits each of address and bi-directional data lines, is fully synchronous, allows for connection to 8-bit, 16-bit and 32-bit devices, has a least significant bit of zero, uses natural byte alignment and little-endian byte addressing, and supports slave cycle termination.

At any one time on the peripheral bus 38, there will be one master VC, as determined by bus arbiter 56, and a plurality of slave VCs. The bus supports the following transfer requests from the master: read8, read16, read32, write8, write16 and write32, where e.g. write32 is a 32-bit write command. Bus 38 supports the following types of responses from slaves: transfer acknowledge without stop (cycle completion); transfer acknowledge with stop (disconnect with data); and response termination from slaves without acknowledgement (disconnect without data).

Table I sets forth the descriptions of all signals appearing on the peripheral bus 38.

TABLE I

Peripheral Bus Signals

| Signal Name | Signal type Driver | Width | Active | Description |
|---|---|---|---|---|
| PReqxN | Arbitration Master | 16 One per Master | Low | Peripheral bus arbitration request signal which is active low. These request lines are dedicated to each bus node. |
| PGntxN | Arbitration Arbiter | 16 One per Master | Low | Peripheral bus grant, one for each bus node. One grant is chosen for each node due to the number of nodes on the bus. This is active low. |
| PCmdvalid | Control Master | 1 | High | Indicates to slaves that address and control are valid |
| PReset | System | 1 | High | System reset |
| PClk | Clock | 1 | | Peripheral Bus clock |
| PData[31:0] | Bus | 32 | | Peripheral bus data. Bi-directional data bus with Keepers. |
| PAddr[31:0] | Bus | 32 | | Peripheral bus address |
| PBurst | Master | 1 | High | Burst request indicator |
| PStop | Control Slave | 1 | High | Burst terminate signal from slaves. This signal will indicate to the master that slaves are not capable of accepting/providing more data and to terminate the cycle . . . Cycle Disconnect |
| PAck | Control Slave | 1 | High | Acknowledge signal from slave to master |
| PBytenab[3:0] | Control Master | Up to 4 | | Byte enables. One byte enable per byte of Dwidth. 0000 → default data[7:0] |

TABLE I-continued

Peripheral Bus Signals

| Signal Name | Signal type Driver | Width | Active | Description |
|---|---|---|---|---|
| | | | | THESE ARE EXAMPLES: |
| | | | | 0001 → data[7:0] |
| | | | | 0010 → data[15:8] |
| | | | | 0100 → data[23:16] |
| | | | | 1000 → data[31:24] |
| | | | | 0011 → data[15:0] |
| | | | | 1100 → data[31:16] |
| | | | | 1111 → data[31:0] |
| PRnw | Control Master | 1 | | Read/Write signal read → 1; write → 0 |

Acknowledge signal Pack and stop signal PStop are interpreted together. These signals are asserted by the slave VCs. There are three basic combinations:

PAck without PStop. This implies successful completion of the request by slaves.

PAck with PStop. This is valid only during burst transfers. It indicates that slaves are not capable of transferring the requested data. The master must latch the data once PAck and PStop are asserted; however, the burst is terminated here by the responsible slave.

PStop without PAck. This implies that the data transfer cycle has been terminated early by the slave. The master should get off of the peripheral bus.

Signal PClk provides the timing for the peripheral bus and for all VCs connected to it.

Signal PReset is used during power-on reset and is synchronized to PClk. This signal is used to bring bus 38 to an idle state, in which PCmdvaild, PAck, PStop and PBurst are all deasserted and low, and in which all arbitration signals are deasserted and high.

Signal PCmdvalid is driven by the designated master peripheral VC to indicate that there is a valid command address and command on the bus. All master control signals are qualified by this command valid signal. The master must keep PCmdvalid asserted, and all of its control signals valid and stable, until it receives PAck from the slaves, with or without PStop.

Signals PBytenab[3:0] are driven by the master to indicate to the slaves the valid data location for writes and the data location for when the slaves provide read data. There are a total of four byte enable bits. The use of these byte enables is restricted to the contiguous and byte-aligned cases. For eight-bit peripherals, there will not be any byte enable since data will always be on the [7:0] portion of the data bus. For 16-bit peripherals, there will be two valid byte enables, PBytenab[1:0] indicating valid data in the [15:0] range. A 32-bit VC can talk to a 32, 16 or 8-bit device.

Signal PBurst is asserted by the master only, and is used by the slaves to avoid an address decode cycle. The burst transfer is completed once a transaction occurs and the burst signal is de-asserted. Masters can terminate bursts by asserting the PCmdvalid signal. PBurst must be deasserted one cycle before the PCmdvalid is deasserted by all masters.

Signal PAck is asserted by the slave to indicate the completion of a transfer between the master and the slave. During writes, PAck indicates that the slave has accepted the data which is on the PData[31:0] bus. During read operations, the assertion of the PAck signal by a slave indicates that the slave has placed the data to be transferred to the master on the peripheral data bus. Any peripheral VC assuming master status should be capable of sampling PAck in the same cycle as it asserts PCmdvalid. In this instance, the slave can provide the data immediately after sampling the valid address and the PCmdvalid signal is asserted.

Peripheral Bus Protocol and Arbitration

The peripheral bus arbiter 56 determines how many of bus 38's nodes are active to avoid bus dead time, thus improving bandwidth. The arbiter's round-robin queue looks forward as well as moving backward in order to avoid wait states between request and grant. All grants are synchronous and generated in the cycle after the request, if the bus is available. The address and data are transferred one cycle after the grant is asserted. All control signals are valid and are to be driven while PCmdvalid is asserted.

The preferred protocol for peripheral bus 38 allows only one master to access bus 38. For all read cycles, the master will assert the request signal and wait for the grant from the arbiter 56. Once granted, the master will drive the address, size and the read/write signal onto the peripheral bus 38, along with PCmdvalid, which serves as the qualifier for all other data and control signals. The slave peripheral VCs will monitor the command signal and decode the address to determine if one of them has been selected. Once selected, the slave will either assert PStop to disconnect the cycle or assert PAck to indicate successful cycle completion. Where both the PAck and PStop bits are high, it is an indication that the cycle has been successfully completed but that no more data should be sent.

In write cases, the peripheral VC master, once control is granted by the bus arbiter 56, will drive the address followed by write data. The master will keep on driving the data until slave gives the acknowledgement signal Ack, with or without PStop.

In general, a VC acting as a slave should not need to store or "FIFO" any request information which includes the address and data, since PAck can be used to force the master to hold the request information. However, since the bus can allow up to 16 nodes, it is required that all slaves latch the request information to avoid loading and wire delay issues.

A master VC on the peripheral bus holds the bus until it receives PAck from a targeted slave VC. Each VC capable of acting as a master should have a timeout counter (included in state machine 156, FIG. 11) to get off the peripheral bus in case the slave VC does not respond in time. In a preferred embodiment, the maximum number of wait cycles is 16, after which the master VC will deassert PCmdvalid and will re-request the bus. All VCs capable of acting as masters should have the capability to sample PAck in the same cycle as PCmdvalid is asserted; this is for fast slave VCs and when the bus is running at low frequencies.

Figure 2:
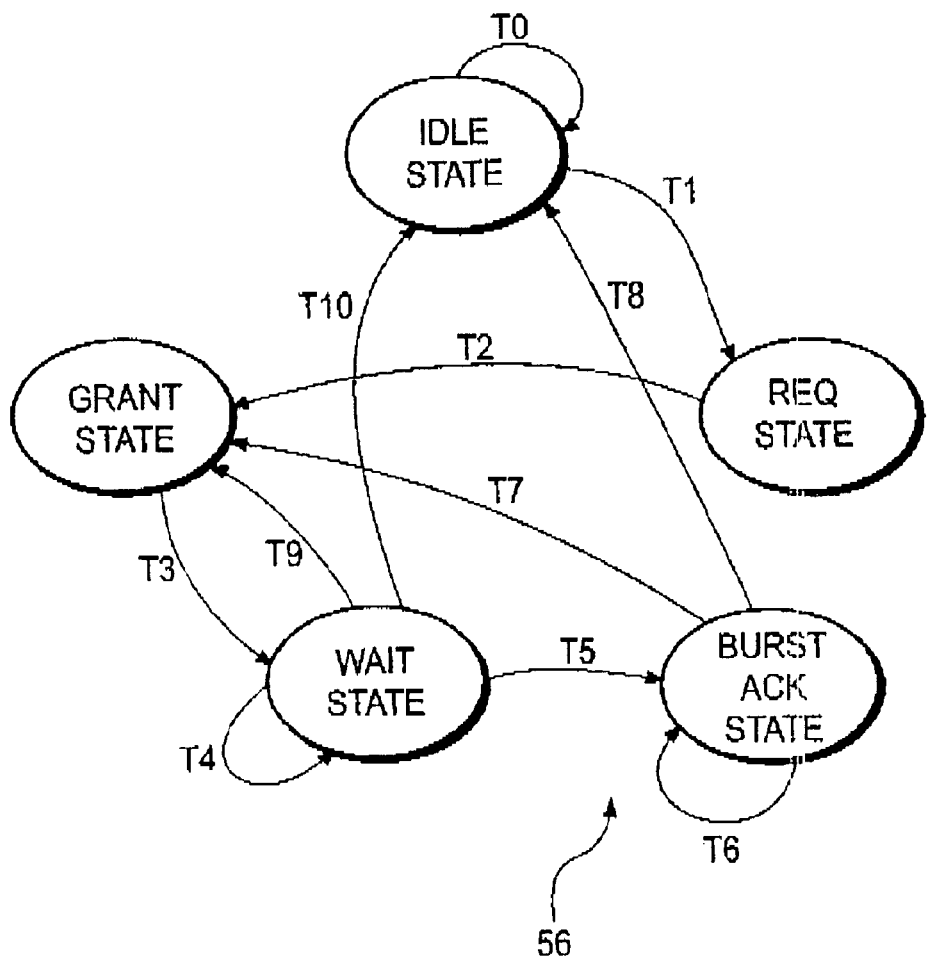
FIG. 2 is a state machine diagram of a peripheral bus arbiter according to the invention.

FIG. 2 is a state machine diagram for the peripheral bus arbiter 56, showing idle, grant, wait, request and burst acknowledge states, and the transfer paths between these states. Path T0 occurs when there are no requests or in the instance of a reset. Transfer T1 leads to a request state. Transfers T2 and T3 always happen. Transfer T4 occurs when (!PAck|PStop)&Pcmdvalid is true. Transfers T5 and T6 take place when (PAck&PBurst) is true. Transfers T7 and T9 occur when (PAck&!PBurst & req)|(!PStop & req) is true. Transfers T8 and T10 occur when (PAck & !PBurst & !req)|(!PStop & !req)|Timeout is true.

Figure 3:
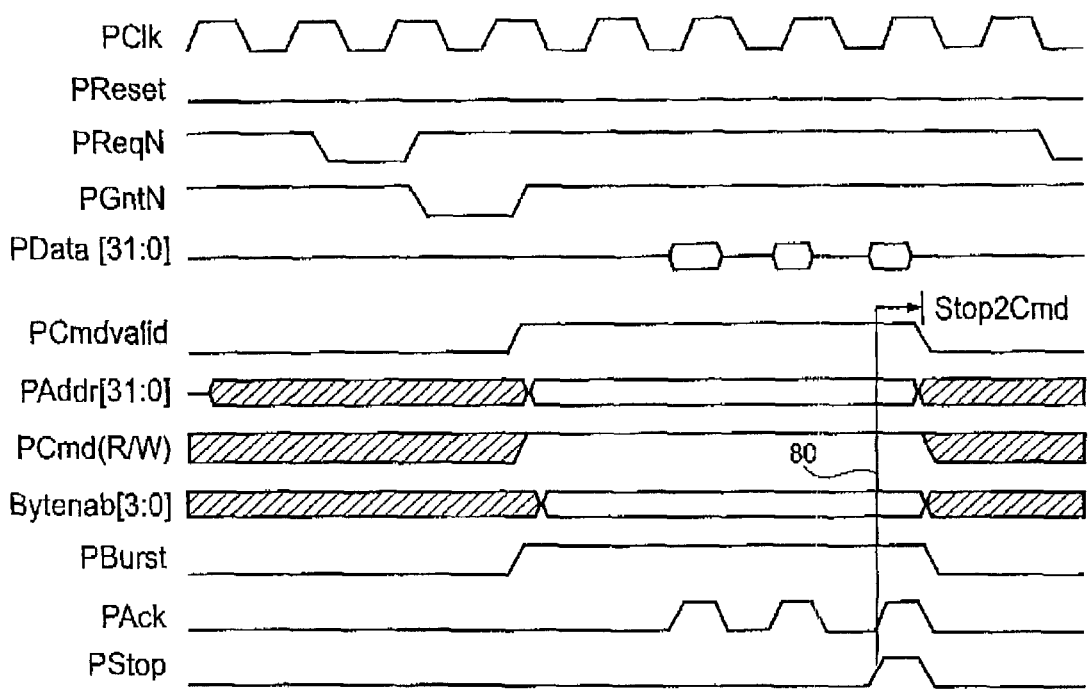
FIGS. 3–9 are timing diagrams demonstrating the behavior of the peripheral bus and connected virtual components for different combinations of certain control signals.
Figure 4:
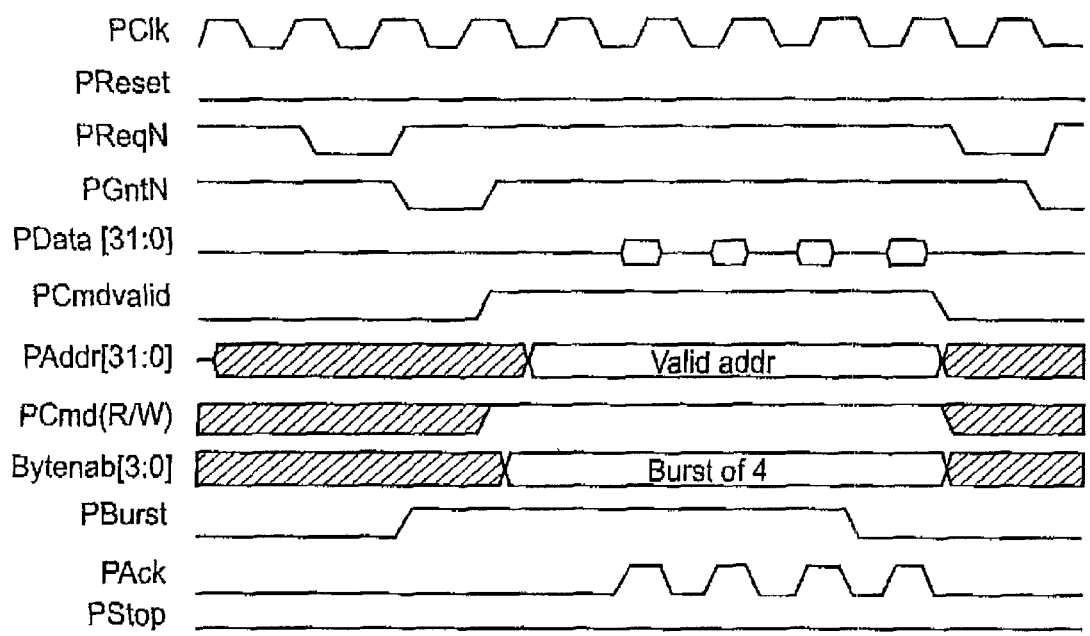
Figure 5:
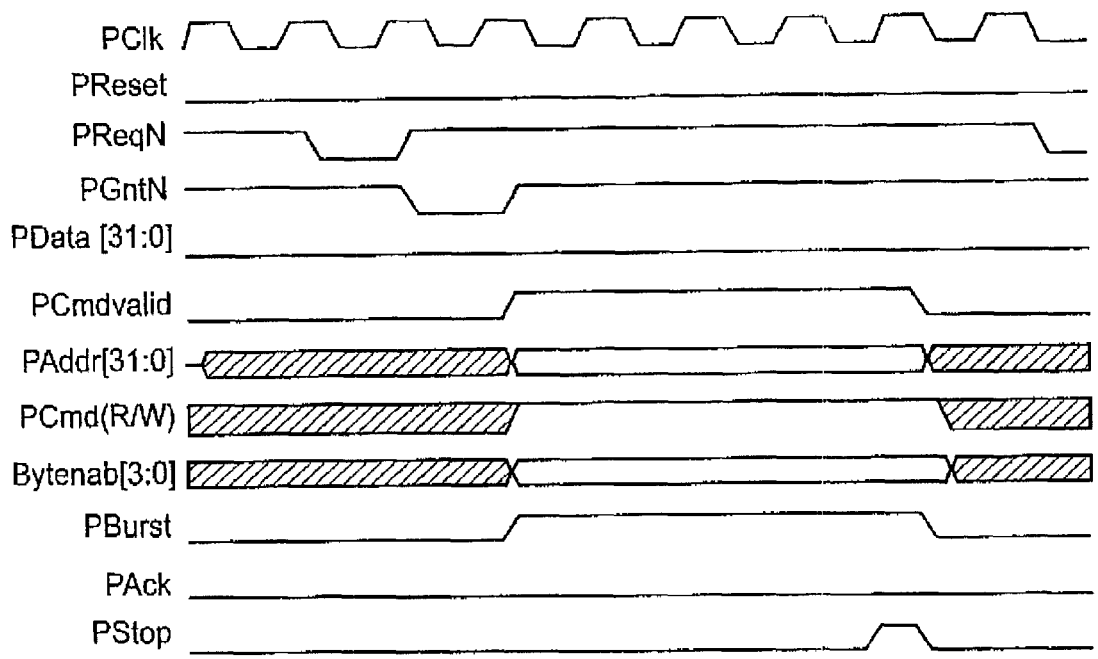
Figure 6:
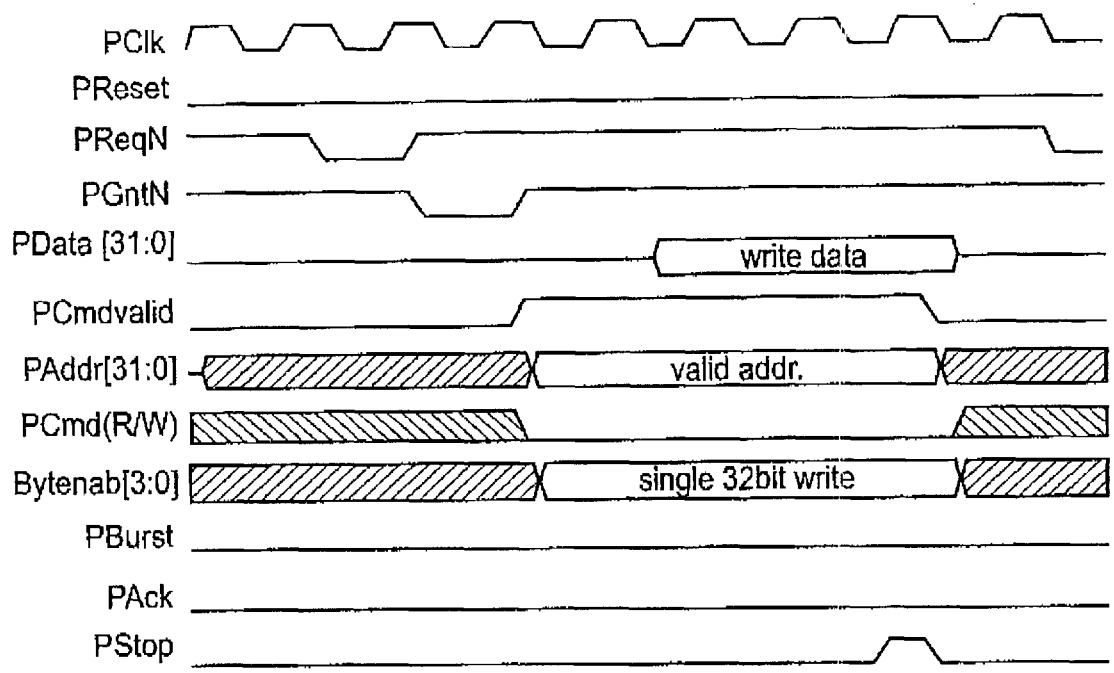
Figure 7:
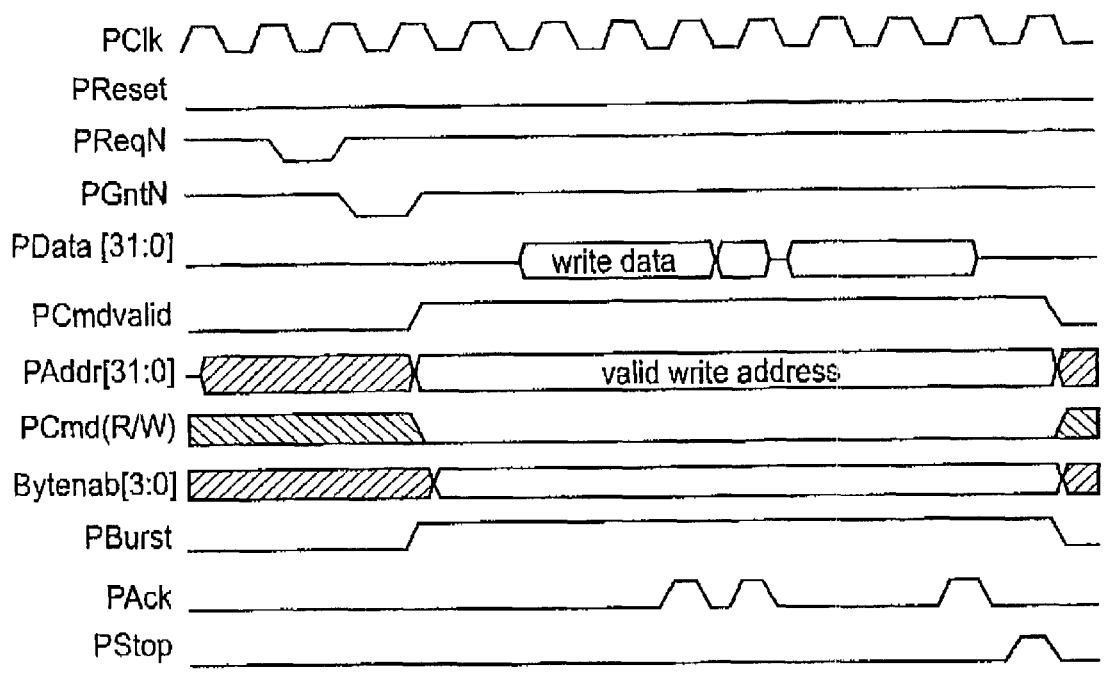
Figure 8:
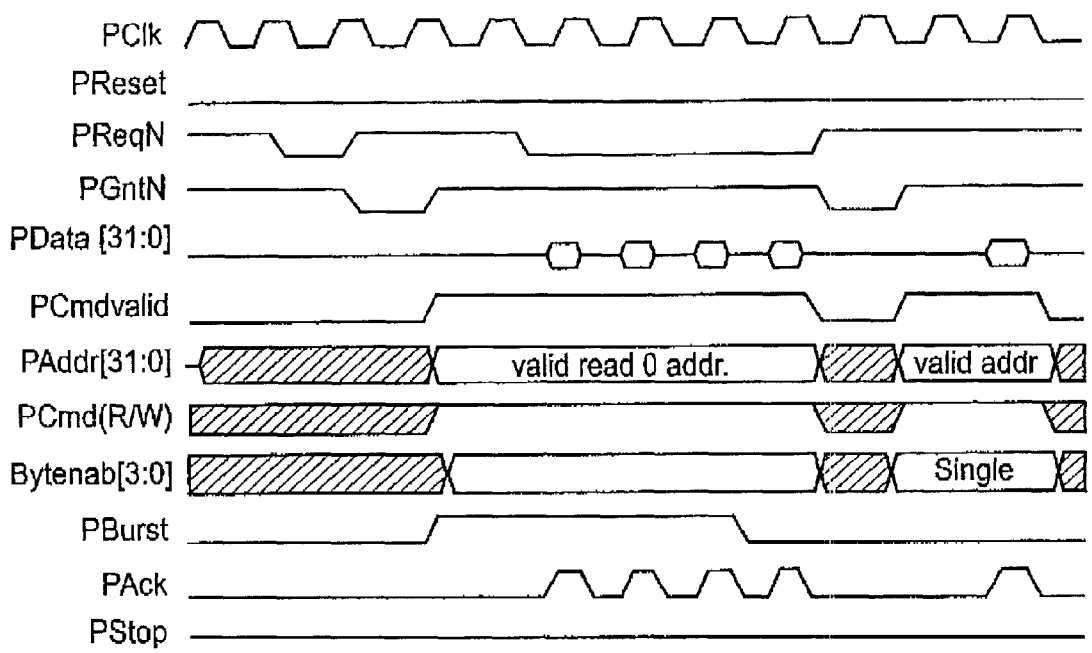
Figure 9:
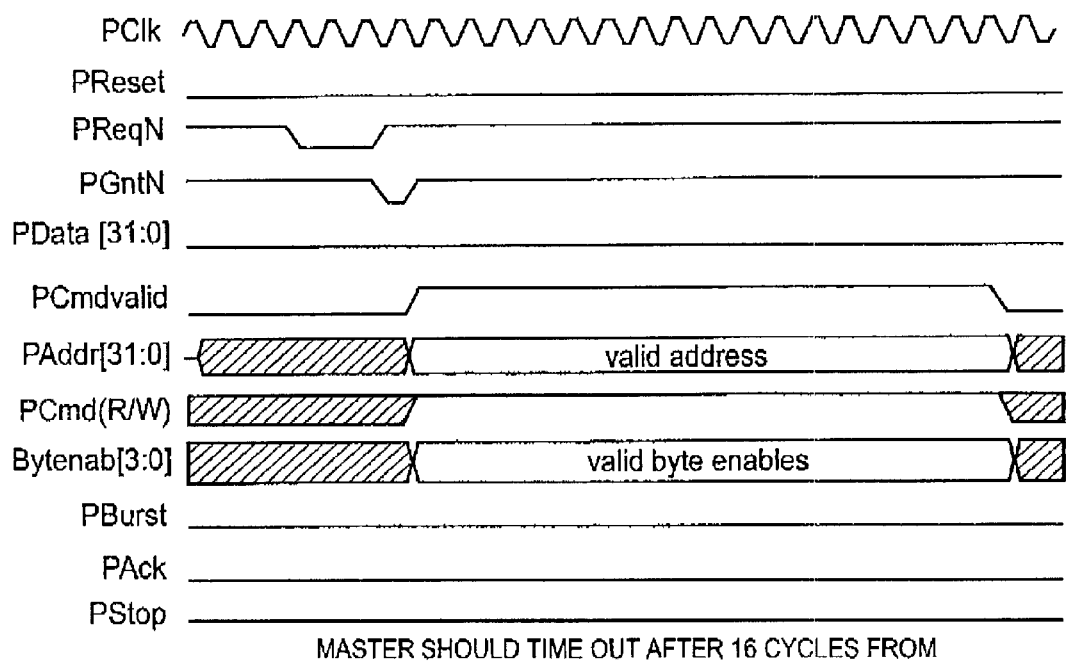

FIGS. 3–9 depict timing diagrams showing the interaction of different signals on the peripheral bus 38. In FIG. 3, a burst read cycle has been disconnected with the assertion at time 80 of a PStop signal by the targeted slave VC. FIG. 4 shows a burst read cycle without a PStop termination. FIG. 5 shows the case where PStop has been asserted by the slave but PAck has not. FIG. 6 shows a write cycle with a PStop disconnect. In FIG. 7, there has occurred a delayed PAck pulse and a PStop signal to terminate a write cycle. FIG. 8 portrays back to back read cycles without any PStop signal having been asserted. Finally, in FIG. 9, there is shown the preferred embodiment wherein the master times out in 16 cycles after getting no response from the slave, and thereafter deasserting PCmdvalid.

Peripheral Virtual Component Interface

Figure 10:
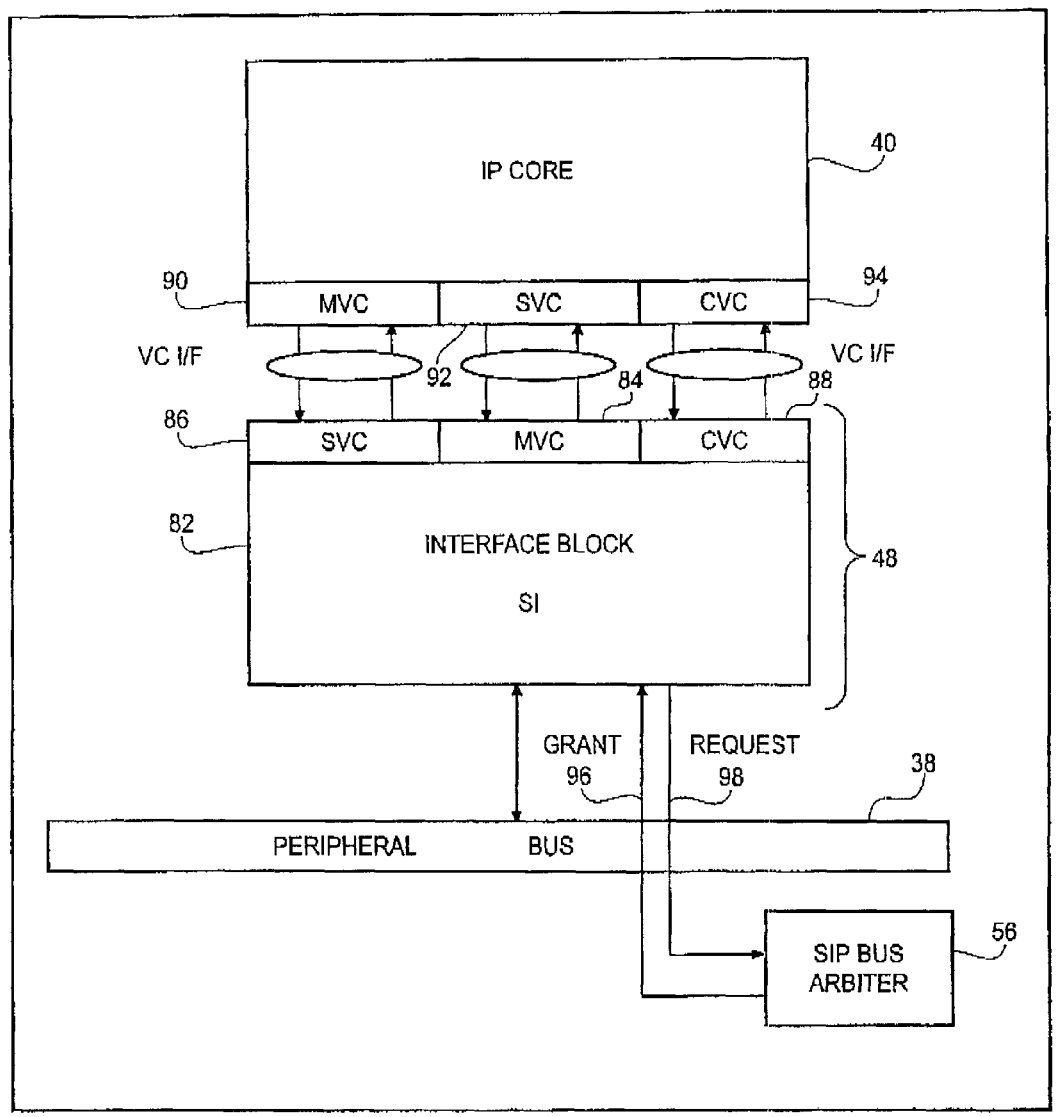
FIG. 10 is a schematic block diagram of a VC an associated SI block and virtual component interfaces (VCIs) established between them.

Central to the invention is the use of virtual component interfaces, or a bus wrappers, to connect respective VCs which may come from diverse sources to either the peripheral bus 38 (the case considered here next) or to the system bus 26. FIG. 10 is a high-level block diagram showing a representative peripheral virtual component interface 48 and the virtual component or "core" 40 to which it connects. The virtual component interface 48, or VCI, consists of a novel interface block 82 and a set of VC interface circuitry 84, 86 and 88. Interface circuitry occurs both within the design of the core 40 itself and in the VCI 48. The core circuit 40 ports through a master interface circuit 90, a slave interface circuit 92, and a control interface circuit 94. These communicate, respectively, with a slave interface circuit 86, a master interface circuit 84 and a control interface circuit 88 of the interface block 82.

Figure 12:
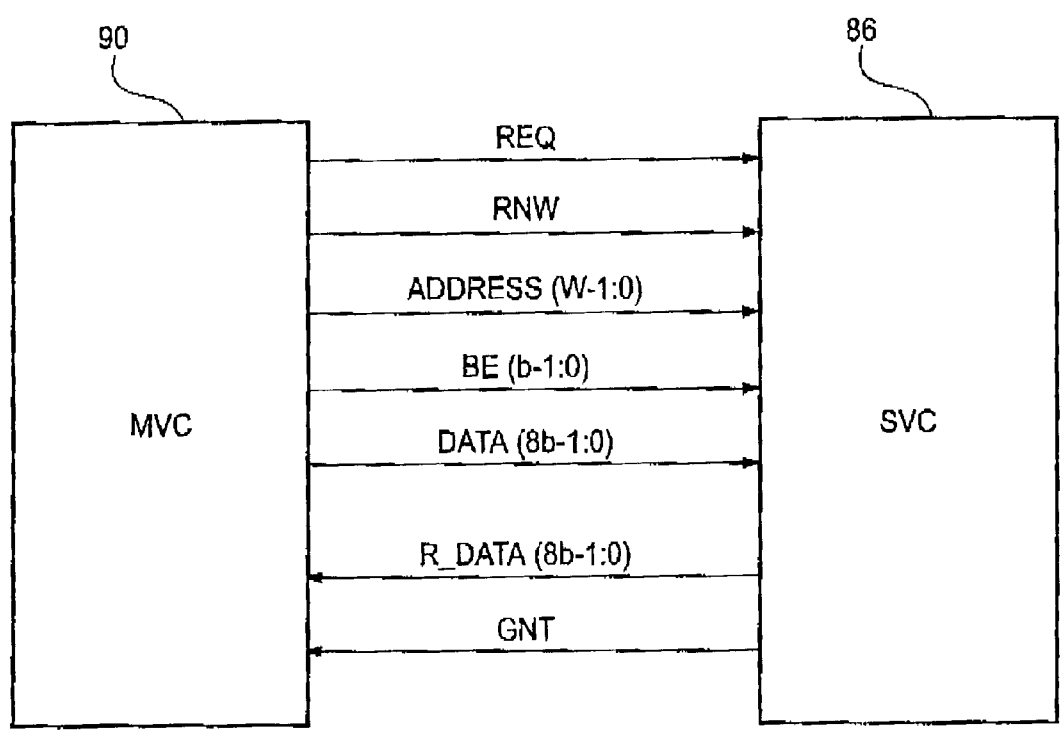
FIG. 12 is a block diagram of an exemplary VCI interface.

FIG. 12 is a detailed block diagram of the VCI interface, showing the connections between a master virtual component (MVC) 90, and a slave virtual component 86. The MVC 90 is also called the "initiator" and the SVC 86 is called the "target". The hardware contents of the blocks 90 and 86 may be no more than buffers. In at least some circumstances, the buffers contained within blocks 90 and 86 are subsumed into the VCs or SI blocks to which they are connected. The REQ and GNT signals are handshake, flow control and shaping signals which validate all signals associated with a cell from which data is being transferred. Where REQ=1, it is an indication that the initiator or MVC 90 has a cell available. When GNT=1, the SVC or target is telling the MVC that the SVC can complete the operation on the cell. The cell of data is transferred when REQ=GNT.

The address has a width W, such as 32 bits. The most significant bit of the address is carried by bit W−1, and the least significant bit is carried by bit 0.

The RNW signal is a single bit code giving the operation type. Where RNW=1, data is to be read from the target peripheral. Where RNW=0, data is to be written to the target peripheral. Wrapping logic is required to map the basic system VCI to this signal. This should be part of the peripheral bus bridge and requires only a few gates. DATA, or as otherwise expressed W_DATA, indicates the data which are transferred by write operations to the target. For use with the peripheral bus, the allowed values of b in FIG. 12 are 4, 2 and 1. Bit 8b−1 is the most significant bit, and bit 0 is the least significant bit. Byte (8b−1: 8b−8) represents the most significant byte. For VCs supporting a data size which is not a power of 2, the next larger supported b will be used with the unused bits tied to logic 0. For example, a 12-bit device will use a 16-bit wide VCI with the foremost significant bits tied to logic 0.

Our R_DATA is the data which is returned from the target with reoperations. Since the peripheral interface has no pipelining, R_DATA is validated by the target when it asserts GNT. It is defined otherwise in the same way as W_DATA above.

The MVC 90 and the SVC 86 also receive a pair of system signals. One of these is CLK. The interface is synchronous to the rising edge only. The other signal is RESET_N. This is active low and deasserts REQ and GNT. The RESET_N signal is used during power-on reset and is used to bring the VCI to an idle or quiescent state, defined by having the REQ signal deasserted and the GNT deasserted. The system asserts RESET_N for at least eight cycles of CLK.

REQ is asserted at the rising edge of CLK and continues until both GNT=1 and the next rising edge of CLK occurs. The REQ signal is driven by a VCI initiator to indicate that there is a valid address, DATA and command on the VCI. All of the initiator control signals are qualified by REQ. The initiator keeps REQ asserted, and all of its control signals valid and stable, until it receives the GNT signal from the target. The initiator should not assert REQ unless the current transaction is intended for the target.

Figure 13:
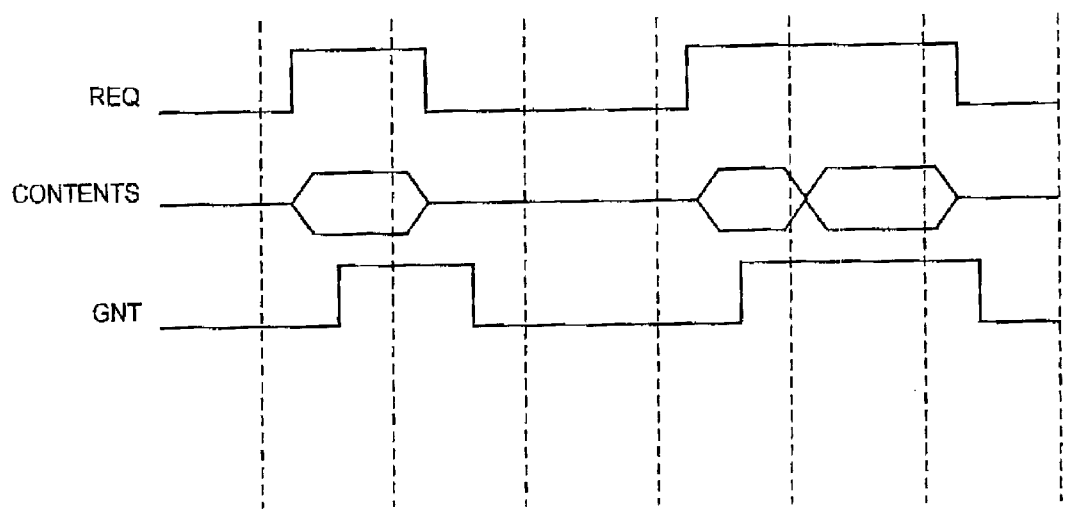
FIG. 13 is an exemplary timing diagram showing the VCI REQ signal, the GNT signal, and the content signal.
Figure 14:
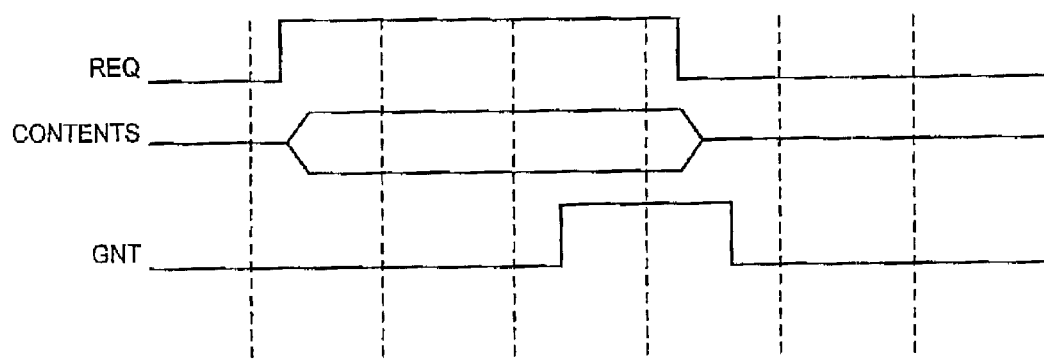
FIG. 14 is an exemplary timing diagram depicting the VCI REQ signal, the GNT signal, and the content signal that includes a later assertion of GNT than in FIG. 13.

FIG. 13 is a timing diagram showing the interrelation of the VCI REQ signal, the GNT signal, and CONTENTS, which includes all of the signals that REQ and GNT signals qualify, such as address, W_DATA and R_DATA. FIGS. 13 and 14 show order of events but do not show actual timing. The vertical lines show rising clock edges.

In FIG. 13, when REQ goes high, it is interpreted to mean that "at the next rising edge, the contents can be read." GNT shows that "the contents have been read" for a write request, or that "data can be read" for a read request. Maintaining REQ high (or asserted) for another clock cycle after GNT=1 means that another request or response is ready for reading, as is shown on the right hand side of the FIGURE.

FIG. 14 is a similar diagram showing a slow reaction, as evidenced by the late assertion of GNT. In such a case, REQ and the CONTENTS must be maintained until GNT has become asserted (GNT=1). There is also a third kind of handshake, called default grant, where GNT is active all of the time. The timing of the other signals is similar to FIG. 13.

SI Block Architecture

Figure 11:
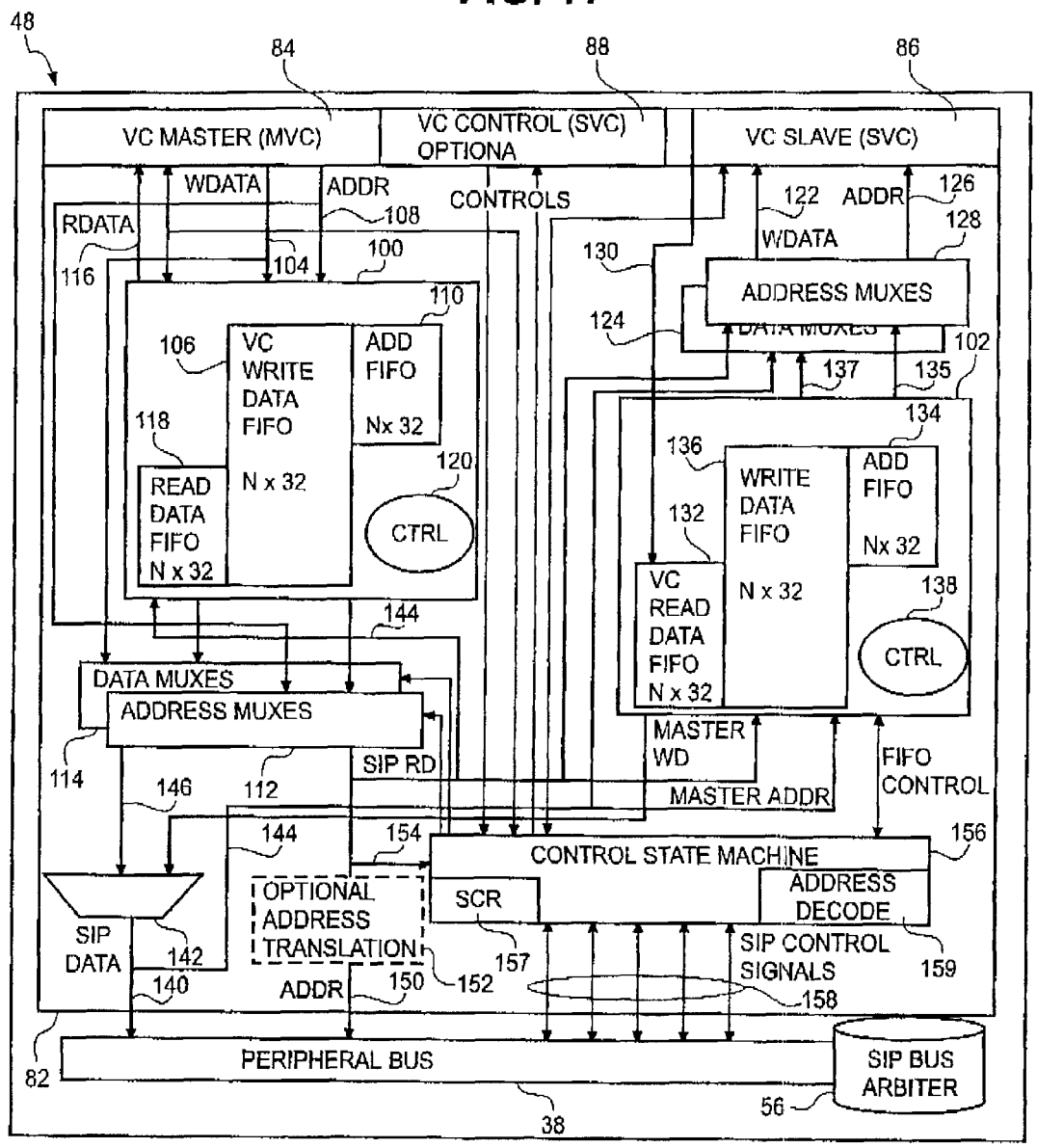
FIG. 11 is a more detailed functional block diagram showing the internal components of the SI block introduced in FIG. 10.

Referring to FIG. 10, the block 48 provides zero cycle latency between the peripheral bus 38 and the VC 40 except for arbitration, if the VCI circuit does not use the FIFO memory components (described in conjunction with FIG. 11). The interface block 82 supports bidirectional and unidirectional 32-bit data buses. The use of 32-bit data supports word and half-word reads and writes. The connected-to VC can be 8, 16 or 32 bit. The circuit 48 permits byte reads and writes including 3-byte transfers, and further supports word, half-word and byte burst transfers. The block 48 uses little endian byte addressing and supports infinite burst transfers. Block 48 further supports bus timeout and error mechanisms. Interface block 82 and VCI circuits 86, 84, 88, 90, 92 and 94 run at the same clock, which is the clock used to synchronize the peripheral bus 38. The block 48 supports full scan DFT (design for testability). As will be detailed below with respect to FIG. 11, the block 82 provides programmable address and data FIFOs, address decode logic (SAD), and programmable peripheral bus address translation support (SAT). Finally, the interface block 82 supports a 32-bit control register (SCR) which is programmed via the peripheral bus 38.

The interface block 82 communicates directly with the peripheral bus 38, and with the bus arbiter 56 via bus control grant and request lines 96 and 98. The core circuit or VC 40 and block 48 together form an encapsulated unit which can be plugged into real estate on the system chip 12 by the systems integrator, and mixed and matched with other like encapsulated units without worrying about communications protocol incompatibility.

FIG. 11 is a more detailed diagram of an SI block 82. The illustrated embodiment of SI block 82 supports address and data pipelining, and contains a set of master first-in, first-out (FIFO) memories 100 and a similar set of slave FIFO memories 102. As acting in a master capacity, the core circuit or VC transmits write data on a bus 104 to a VC write data FIFO 106, and the address for the write data on a bus 108 to an address FIFO 110. The address is also supplied via bus 108 to an address multiplexer 112, while the write data is also supplied via bus 104 to a data multiplexer 114. Where data is to be read by the master VC, the data passes to the VC via a read data bus 116 from a read data FIFO 118. The master FIFO block 100 further consists of control circuitry 120, which can consist of a state machine.

The slave FIFO architecture is similar. Acting as a slave, the VC or core circuit accepts write data via a bus 122 from a data multiplexer 124, and accepts addresses for these data via an address bus 126 from an address multiplexer 128. Where data are to be read from the VC, the data proceed via read data bus 130 to a read data FIFO 132. Addresses for either a read or a write are communicated to address multiplexer 128 from an address FIFO 134 using an address bus 135. Where a write is being made to the slave VC, the write data are sent from the write data FIFO 136 to the data multiplexer 124 using a write data bus 137. Control circuitry 138 is provided to the slave FIFO set 102 to control the receive/transmit direction of the FIFOs 132–134.

A main data bus 140 is connected to a port of a multiplexer 142 and to the peripheral data bus 38. Read data from the peripheral bus 38 are sent via bus branch 144 to the read data FIFO 118. Data from the master VC write FIFO 106 are sent via bus 146 to the multiplexer 142 for transmission onto the peripheral bus 38. Write data from a master VC (not shown) connected to the bus 38 at another node are communicated to this node's VC acting as a slave via a master write data bus 148 and the write data FIFO 136. An address bus 150 connects the address lines of the peripheral bus 38 to an address translation block 152, which is optional and which in an alternative embodiment is omitted. An address bus 154 connects the translation block 152 (if there; otherwise, to the bus 150) to the address multiplexer 112, the address multiplexer 128, the address FIFO 134, and an interface block control state machine 156. Control lines connect the state machine 156 to the master FIFO block 100, the slave FIFO block 102, the master VC interface circuit 84, the (optional) VC control interface circuit 88, and the slave VC interface circuit 86. Bus control signals such as PAck, PStop and PCmdvalid pass by way of control lines 158 to the bus 38 from state machine 156.

The FIFOs 106, 110, 118, 132, 136 and 154 improve performance by avoiding the stalling of the VC core and the peripheral bus 38. For example, the VC, acting as a master, can write to FIFO 106 and then resume processing other requests. The FIFO circuit 100 (and more particularly, the control circuit 120 therein) will give an Ack signal to the VC core circuit 40 (not shown in FIG. 11) while the data is still within SI block 82. It will then request the peripheral bus 38 and transmit the write data to on-chip bus (OCB) slave(s) connected to other nodes on the peripheral bus 38. If a peripheral slave VC asserts a PStop, the block 100 will retry the request until it is completed successfully. No request will be removed from the FIFOs 100 or 102 until the controlled data are successfully transferred.

Similarly, write data is stored in write data FIFO 136 as coming in from the bus 38. The address and data will be queued, and then the control circuit 138 will generate a request to the VC core circuit through interface circuitry 86.

The write data FIFOs 106 and 136 are tagged with addresses to maintain coherency. Each address FIFO 110, 134 will contain the address, read/write information, and size and data tag. This data tag will match the data tags in the write data FIFOs.

The read data FIFOs 118 and 132 are much simpler since they do not require address tagging. These read data FIFOs can be considered to be dual port memory arrays. The read data FIFOs 118 and 132 can be one to N deep. In some embodiments, it may not be beneficial to have read data FIFOs 118 and 132, since a VC master will automatically increment addresses during burst transactions. For example, a VC core circuit can request burst reads from other, slave agents, but will wait until the data is received to increment the address.

Alternatively, the interface block 82 can be configured without FIFOs (106, 110, 118, 132, 134 and 136 in FIG. 11). The block 82 would function in substantially the same way, but no pipelining of the addresses and data would be possible. In this alternative embodiment, the block 82 would simply act as a transfer medium between the virtual component and the peripheral bus 38.

The state machine 156 mainly interfaces with the bus arbiter 56. It is responsible for requesting the peripheral bus 38 and transferring the ACK signal and read data on the VC interface 84 for the requesting master VC.

Preferably, the bus 38 is a tri-state bus with internal bus keepers. Therefore, address and data multiplexers 112, 114 are required to steer the data onto the bus 38 as well as receive such data from other interface blocks. The state machine 156 will generate all controls for these multiplexers, as shown by the control lines between the state machine 156 and the data and address multiplexers 112 and 114 and the output enables for the tri-state buffers (not shown).

The block 82 is a completely synchronous module. All signals are synchronous and are registered internally. While in some cases this may cause a one-cycle penalty, it produces a much more stable design and it is easier to debug. In the illustrated FIFO based design, the control state machine 156 also controls the FIFO state machines (control blocks 120 and 138), since it is responsible for monitoring the peripheral bus 38.

VCI 48 is capable of handling each of the following requests. From the bus, block 82 can receive and process a peripheral bus master write to a slave VC, or a read request to a slave VC.

A VC master 40 connected to bus 38 may request data from a slave connected to the peripheral bus 38, or write data to such a slave VC. The peripheral bus VC master may also access internal registers of the VCI 48, such as control registers 157.

The control state machine 156 is architecturally divided into two parts: a bus data request generator, and a VC data request generator. Alternatively, the state machine 156 can be considered as two separate state machines (receive and send). There is a necessary handshake between these two state machine components, since only one request at a time can be processed onto the peripheral bus 38.

The control state machine 156 includes an address decoder block 159. Once the state machine 156 samples Cmdvalid, the address decoder 159 samples the active address to determine if the node represented by VCI 48 is selected. This sampling is necessary because there are no chip selects as inputs from the bus arbiter 56. All VCI nodes on the peripheral bus 38 will see the Cmdvalid signal and decode the address internally, but only one of those nodes should be selected. The nodes are defined as part of the system address map for the entire system design.

The address decoder 159 receives a Cmdvalid signal as well as an address from the peripheral bus 38. The decoder 159 decodes the address and compares it to the node address. Once the node address has been matched to the address on the bus, the decoder 159 sends a CS chip select signal to start the transfer of data to the core VC circuit 40.

The address and data multiplexers 112 and 114 are controlled by the state machine 156. This is required to ease signal timing and meet setup at the other blocks 82 attached to the bus 38. While in the preferred embodiment data and address multiplexers 124 and 128 have been provided at the VC interface, they are not absolutely required since the address and data lines are unidirectional.

The state machine 156 will receive the PStop signal from the bus 38. Once this is sampled, the state machine 156 will generate a S_VC_ERR signal to the requesting VC master 40. The state machine will also time out after the programmed timeout period, preferably set at 16 cycles but programmable to a different value over bus 38.

The control register 157 is preferably a 32 bit control register that is programmable via the bus 38 to be given an address range that is part of the system address map.

The state machine 156 controls the FIFO block state machines 120 and 138.

The control register 157 has one bit devoted to the Ack signal, three bits for designation of a time out period, which can vary between four cycles and an infinite number of cycles, and the remainder of the bits are dedicated to storing the address range. It is programmable at boot via the bus 38.

Table II set forth immediately below identifies other signals communicated to and within the SI block 82, apart from signals emanating from the bus 38 (which are shown in Table I).

TABLE II

| Signal Name | SIG TYPE | Direction | Width | Active | Description |
| --- | --- | --- | --- | --- | --- |
| S_CMDVALID | VC | OUT | 1 | High | VCBUS Command Valid signal. ADDR/WDATA/RNW/BURST/BYTENA qualifier signal |
| S_ADDR | VC | OUT | 32 | | VCI word address bus |
| S_RNW | VC | OUT | 1 | | Read/Write signal read → 1; write → 0 |
| S_BYTENAB | VC | OUT | Up to 4 | High | VC byte enables One byte enable for each byte of data. |
| S_BURST | VC | OUT | 1 | High | Burst signal |
| S_WDATA_Bn [7:0] | VC | OUT | 8, 16, 32 | | VC write data that supports 8, 16 or 32 bit peripherals. |
| S_RDATA_Bn [7:0] | VC | IN | 8, 16, 32 | | VC read data that supports 8, 16 or 32 bit peripherals. |
| SACK | VC | IN | 32 | High | VCI Transfer acknowledge. |
| S_VC_ERR | VC | IN | 1 | High | VC bus error. This is an input to SI from the Slave VC indicating an error has occurred. SI will generate the PStop signal on the peripheral bus to the requesting master to abort/retry the transaction. Error and ACK encoding SACK S VC ERR<br><br>0    0 → Idle<br>0    1 → Abort<br>1    0 → Normal ACK<br>1    1 → Retry |
| M_CMDVALID | VC | IN | 1 | High | Master VC Command Valid |
| M_ADDR | VC | IN | 32 | | Master VC address |
| M_RNW | VC | IN | 1 | | Read/Write signal read → 1; write → 0 |
| M_BYTENAB | VC | IN | Up to 4 | High | Master VC byte enables One byte enable for each byte of data. |
| M_BURST | VC | IN | 1 | High | Master Burst signal |

TABLE II-continued

| Signal Name | SIG TYPE | Direction | Width | Active | Description |
|---|---|---|---|---|---|
| M_WDATA_Bn [7:0] | VC | IN | 8, 16, 32 | | Master VC write data that supports 8, 16 or 32 bit peripherals. |
| M_RDATA_Bn [7:0] | VC | OUT | 8, 16, 32 | | Slave/Peripheral Bus VC read data that supports 8, 16 or 32 bit peripherals. |
| M_ACK | VC | OUT | 32 | High | Slave/Peripheral Bus VCI Transfer acknowledge. |
| M_VC_ERR | VC | OUT | 1 | High | Master VC bus error. This is asserted when peripheral bus SM samples PStop asserted high from peripheral bus slaves. VC_ERR indicates to VC requester to retry later. This is carried onto the OCB bus which is the original requester of the bus. |
| C_CMDVALID | VC | OUT | 1 | High | VCBUS Command Valid signal. ADDR/WDATA/RNW/BURST/ BYTENA qualifier signal |
| C_ADDR | VC | OUT | 32 | | VCI word address bus |
| C_RNW | VC | OUT | 1 | | Read/Write signal read → 1; write → 0 |
| C_BYTENAB | VC | OUT | Up to 4 | High | VC byte enables One byte enable for each byte of data. |
| C_BURST | VC | OUT | 1 | High | Burst signal |
| C_WDATA_Bn [7:0] | VC | OUT | 8, 16, 32 | | VC write data that supports 8, 16 or 32 bit peripherals. |
| C_RDATA_Bn [7:0] | VC | IN | 8, 16, 32 | | VC read data that supports 8, 16 or 32 bit peripherals. |
| C_ACK | VC | IN | 32 | High | VCI Transfer acknowledge |
| SI_SCAN_IN | SYS | IN | 1 | High | SCAN IN to scan flops |
| SI_SCAN_OUT | SYS | OUT | 1 | High | SCAN OUT |
| SI_SCAN_CLK | SYS | IN | 1 | | Scan clock that could be the same as system clock. |
| SI_SCAN_EN | SYS | IN | 1 | High | Scan enable- Test Mode. |

Table II shows the signals, from sources other than the peripheral bus 38, that are experienced by various components of the VC chip. Signals with "S" prefix emanate from or are concerned with a VC component acting as a slave. Signals having an "M" prefix come from a master VC. Signals with a "C" prefix are control signals from the virtual component.

In summary, a novel on-chip bus and virtual component integration methodology has been described and illustrated. By providing a very few on-chip buses of standardized design and a standardized virtual component interface for communication between a selected one of the OCBs and the VC, the system and method creates a "plug and play" VC capability for the systems integrator to use. The present invention provides a peripheral virtual component interface that is a subset of a more elaborate system virtual component interface, permitting easy bridging between the two standardized OCBs to which the VCs and their "bus wrappers" are connected.

While a preferred embodiment of the present invention has been described and illustrated, numerous departures therefrom can be contemplated by persons skilled in the art, for example by varying the number of data and address lines, the number and type of bus signals and other characteristics. Therefore, the present invention is not limited to the foregoing description but only by the scope and spirit of the appended claims.

We claim:

1. An integrated circuit implemented on a single semiconductor chip, comprising:
   a first bus having a first bus definition;
   a plurality of virtual components, outputs from and inputs to each of the virtual components being not necessarily compliant with the first bus definition;
   for each of the virtual components, a respective interface block linking the virtual component to the first bus, the interface block translating the outputs from the virtual component to signals complying with the first bus definition, the interface block translating signals from the first bus to signals acceptable to the virtual component.

2. The integrated circuit of claim 1, wherein at least two of the virtual components are designed by different vendors and have different input and output requirements.

3. An integrated circuit implemented on a single semiconductor chip, comprising:
   a system bus having a system bus definition;
   a plurality of system virtual components implemented on a single semiconductor chip, outputs from and inputs to each of the system virtual components being not necessarily compliant with the system bus definition;
   for each of the system virtual components, a respective system virtual component interface linking the system virtual component to the system bus, the system virtual component interface translating signals from the respective system virtual component to signals complying with the system bus definition, the system virtual component interface translating signals from the system bus to signals acceptable to the respective system virtual component;
   a peripheral bus having a peripheral bus definition, the peripheral bus definition being a subset of the system bus definition;

a plurality of peripheral virtual components, outputs from and inputs to each of the peripheral virtual components being not necessarily compliant with the peripheral bus definition;

for each of the peripheral virtual components, a respective interface block translating signals from the respective peripheral virtual component to signals complying with the peripheral bus definition and the system bus definition, the interface block translating signals from the peripheral bus to signals acceptable to the respective peripheral virtual component; and a bridge between the peripheral bus and the system bus to allow communication therebetween.

4. The integrated circuit of claim 3, wherein the bridge includes an interface block.

5. The integrated circuit of claim 3, wherein at least some of the peripheral virtual components are port circuits complying with a plurality of different external communications protocols.

6. The integrated circuit of claim 5, wherein the port circuits include one or more circuits selected from the group consisting of IEEE 1394 port circuits, USB port circuits and ethernet port circuits.

7. The integrated circuit of claim 3, wherein the system virtual components further include one or more system virtual components selected from the group consisting of DMA controller circuits, Memory Management Unit (MMU) circuits, cache memories, memory controller circuits and peripheral component interface (PCI) port circuits.

8. The integrated circuit of claim 3, wherein a peripheral bus arbiter is coupled to the peripheral bus to control access thereto by the peripheral virtual components according to a round-robin methodology.

9. The integrated circuit of claim 3, wherein the peripheral bus is synchronous.

10. The integrated circuit of claim 3, wherein at least one of the virtual components is capable of assuming a master status and at least one other of the virtual components is capable of assuming a slave status during any data transfer cycle, predetermined data control signals transmitted from a selected slave virtual component to a master virtual component, said predetermined data control signals including a stop signal which indicates that the slave virtual component has stopped accepting data from the master virtual component.

11. The integrated circuit of claim 10, wherein the data control signals further include an acknowledgement signal having a plurality of states, the stop signal having a plurality of states, different combinations of the states of the stop signal and the acknowledgement signal conveying different information from the slave virtual component to the master virtual component.

12. The integrated circuit of claim 11, wherein the different information includes (a) successful completion of the data transfer by the slave virtual component, (b) an incapability of the slave virtual component to transfer requested data, and (c) an early termination by the slave virtual component of the data transfer cycle.

* * * * *